United States Patent [19]

Denis et al.

[11] Patent Number: 4,900,332

[45] Date of Patent: Feb. 13, 1990

[54] NITROGENOUS COPOLYMERS, THEIR PREPARATION AND USE AS ADDITIVES FOR IMPROVING THE POUR PROPERTIES OF HYDROCARBON MIDDLE DISTILLATES

[75] Inventors: Jacques Denis, Charbonniere les Bains; Bernard Sillion, Lyon; Bernard Damin, Oullins; Robert Leger, Grigny, all of France

[73] Assignees: Institut Francais du Petrole, Rueil-Malmaison; Elf France, Courbevoie, both of France

[21] Appl. No.: 176,064

[22] Filed: Mar. 31, 1988

[30] Foreign Application Priority Data

Apr. 1, 1987 [FR] France .................................. 87 04602

[51] Int. Cl.$^4$ .............................................. C10L 1/18
[52] U.S. Cl. ...................................... 44/62; 525/327.6; 525/329.5; 526/320; 526/323.2; 526/262
[58] Field of Search ..................... 526/262, 320, 323.2; 525/327.6, 329.5; 44/62

*Primary Examiner*—Joseph L. Schofer
*Assistant Examiner*—Alex H. Walker
*Attorney, Agent, or Firm*—Millen, White & Zelano

[57] ABSTRACT

Copolymers of average number molecular weight from about 300 to 5,000 comprising recurrent units originating (A) from alpha olefins, (B) from $\alpha,\beta$ unsaturated $\alpha,\gamma$ dicarboxylic compounds, (C) from unsaturated acid esters of 1,2-diols, optionally etherified or esterified, and (D) optionally from acrylic esters, the proportions of the recurrent units being 5-60% for (A), 10-70% for (B), 10-60% for (C) and 0-60% for (D), at least one of recurrent units (A), (B) and/or (C) comprising at least 12 carbon atoms, and at least 10% of the recurrent units of said copolymer being (B) recurrent units of N-substituted imide type. These copolymers form additives useful to lower the pour point of middle distillates, particularly of gas-oils. The use of said additives at a concentration from 0.001 to 2% by weight results in a substantial decrease of the pour point of the treated middle distillates.

17 Claims, No Drawings

NITROGENOUS COPOLYMERS, THEIR PREPARATION AND USE AS ADDITIVES FOR IMPROVING THE POUR PROPERTIES OF HYDROCARBON MIDDLE DISTILLATES

BACKGROUND OF INVENTION

The present invention concerns nitrogenous copolymers particularly useful as additives for improving the pour point properties of hydrocarbon middle distillates. It also concerns compositions of hydrocarbon middle distillates (fuel oils and gas-oils) containing such copolymers.

These copolymers are generally obtained by copolymerizing, by a radical process, monomers generating recurrent units (A), (B), (C) and (D). The compound generating recurrent unit (B) is preferably an anhydride of unsaturated dicarboxylic acid and the obtained copolymer is then reacted with a compound having a primary amine group, to convert at least partly the anhydride groups to imide groups.

The oil distillates concerned by the invention consist of middle distillates (fuel oils and gas-oils) having a distillation range (standard ASTM D86-87) from 150° to 450° C. and more particularly of gas-oils having a distillation range from an initial temperature of about 160°-190° C. to a final temperature of about 360°-430° C.

Many products of the market are recommended for improving the pour point of oil cuts of high paraffin content, such as for example:
  polymers, essentially of long-chain olefins,
  ethylene-vinyl acetate copolymers,
  N-acylaminoethylesters of acid-containing polymers, or halogenohydrocarbon compounds.

On the other hand, U.S. Pat. No. 4,359,325 discloses terpolymers of average molecular weight from 500 to 250,000, formed of 10-94% by mole of units deriving from acrylic or methacrylic esters, 3-65% by mole of units deriving from dicarboxylic compounds (anhydride, diacid, amide, ester or N-substituted imide) and 3-40% by mole of units deriving from diisobutylene. The dicarboxylic units may have been modified, more particularly by condensation of such compounds as dimethylaminopropylamine, triethylenetetramine, tetraethylenepentamine, 2-aminopyridine, N,N-diethylethanolamine, diethanolamine, 1-cyanoguanidine, trimethylolpropane, glycerol and pentaerythritol. These terpolymers, when added to various hydrocarbon oils, for example in a proportion from 0.005 to 2% by weight, improve the pour point thereof.

European patent application 100,248 discloses additives particularly useful for lowering the cloud point of hydrocarbon middle distillates, defined as being polymers of average number molecular weight from about 1,000 to 10,000 obtained by condensation of one or more compounds having a primary amine group with a copolymer comprising:

(A) recurrent units originating from at least one linear alpha olefin, (B) recurrent units deriving from at least one unsaturated $\alpha,\beta$ dicarboxylic compound, in the form of a diacid, a lower alkyl diester or an anhydride, and (C) recurrent units originating from at least one alkyl ester of unsaturated monocarboxylic acid.

The use of the additives disclosed in this patent application also results in a moderate decrease of the pour point of the middle distillates.

French patent application 2,528,667 discloses additives used for modifying the properties of middle distillates, particularly for lowering the cloud point of said distillates and, to a slight extent, their pour point.

These additives are disclosed as being the condensation products of at least one compound containing one primary amine group, particularly linear primary aliphatic monoamines of 12 to 24 carbon atoms, polyamines comprising a linear alkyl radical of 12-24 carbon atoms, ether-amines whose ether group comprises a linear alkyl radical of 12-24 carbon atoms or a primary, $\alpha,\omega$ amino-alcohol of 10-18 carbon atoms, with a copolymer comprising:

(A) recurrent units originating from at least one alkyl ester of unsaturated monocarboxylic acid and/or at least one vinyl ester of saturated monocarboxylic acid, (B) recurrent units originating from diisobutylene, (C) recurrent units originating from at least one unsaturated $\alpha,\beta$ dicarboxylic compound in the form of a diacid, a lower alkyl diester or an anhydride.

European patent application 112 195 discloses additives for middle distillates having the essential effect of decreasing the temperature at which the first paraffin crystals appear. These additives have also a small effect on the pour point of the middle distillates. They are described as products of number average molecular weight ranging from 1000 to 10,000 obtained by reaction of a compound having a primary amine group with a copolymer containing 20-40% by mole of recurrent units (A) originating from at least one linear alpha olefin, 30-70% by mole of recurrent units (B) originating from at least one unsaturated $\alpha,\beta$ dicarboxylic compound in the form of a diacid, a lower alkyl diester or an anhydride, 5-30% by mole of recurrent units (C) originating from at least one alkyl ester of unsaturated monocarboxylic acid, and 5-15% by mole of recurrent units (D) originating from styrene and/or from at least one of its alkyl, halogen or methoxy derivatives.

SUMMARY OF THE INVENTION

It has now been discovered that certain chemical compounds as hereinafter defined, when added to middle distillates, have a strong action on the pour point thereof. The chemical compounds of this category have also an effect on other properties of middle distillates (fuel-oils and gas-oils): in particular, they have the property of decreasing the temperature at which the first paraffin crystals appear.

The paraffin crystals formed by cooling have a natural tendency to fall together by gravity in the bottom part. This phenomenon, generally called sedimentation, results in the plugging of ducts and filters and is detrimental to a good use of the middle distillates, particularly of gas-oils. By using the chemical compounds recommended according to the invention, the sedimentation rate of the paraffins formed by cooling gas-oils and other middle distillates may be substantially lowered.

Finally, in addition to the above-mentioned properties, the recommended products, when added to gas-oils or middle distillates, further confer them anticorrosive properties on metal surfaces.

The properties of these products, particularly their action on the pour point, are highly important in the refining industry. As a matter of fact, by incorporating these additives with middle distillates, it may be possible, without modifying the distillation scheme, to comply with the specifications in force which are becoming presently more and more severe.

As a general rule, the additives of the invention may be defined as polymers of average number molecular weight of about 400 to 50,000, comprising:

5-60% by mole of recurrent units (A) deriving from alpha olefins and complying with the general formula:

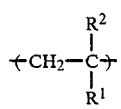

10-70% by mole of recurrent units (B) deriving from unsaturated dicarboxylic compounds and complying with one of the general formulas:

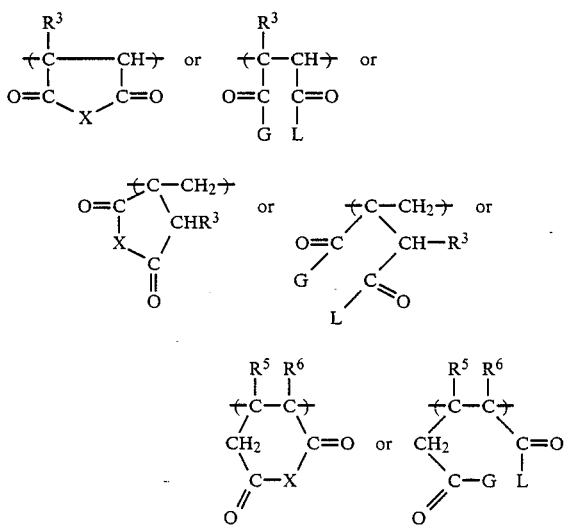

10-60% by mole of recurrent units (C) deriving from 1,2-diol unsaturated esters of the general formula:

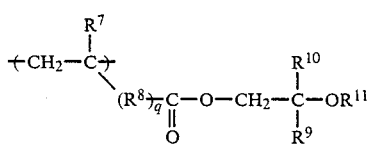

0-60% by mole of recurrent units (D) deriving from acrylic compounds of the general formula:

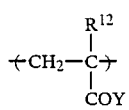

wherein $R^1$ is a hydrogen atom or a lower alkyl group of 1-4 carbon atoms (methyl, ethyl, propyl or butyls), $R^2$ is a hydrogen atom or an alkyl group of 1-30 carbon atoms, $R^3$ is a hydrogen atom or a lower alkyl group of 1-4 carbon atoms, G and L, identical or different, are each an —OH, —$OR^1$ or —$NHR^4$ group, $R^1$ being defined as precedingly and $R^4$ being a monovalent organic radical deriving from a compound comprising a primary amine group complying with one of the general formulas:

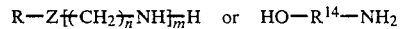

wherein R is a monovalent aliphatic radical of 1-30 carbon atoms, Z is either an oxygen atom —O— or an —$NR^{15}$— group, $R^{15}$ being a hydrogen atom or a monovalent aliphatic radical of 1-30 carbon atoms, n is an integer from 2 to 4, m is an integer from 1 to 4 or may be zero when Z is —NH—, $R^{14}$ is a divalent aliphatic radical of 2-30 carbon atoms, X is an oxygen atom —O— or an =N—$R^4$ group, $R^4$ being defined as precedingly, each of $R^5$ and $R^6$, identical or different, is a hydrogen atom or a lower alkyl group of 1-4 carbon atoms, at least one of them being a hydrogen atom, each of $R^7$ and $R^{10}$, identical or different, is a hydrogen atom or a lower alkyl group of 1-4 carbon atoms, $R^8$ is a divalent aliphatic radical of 1-30 carbon atoms, q is zero or 1, $R^9$ is a monovalent aliphatic radical of 2-30 carbon atoms, $R^{11}$ is a hydrogen atom, a lower alkyl group of 1-4 carbon atoms or a lower acyl radical of 1-4 carbon atoms (formyl, acetyl, propionyl, buytyryl or isobutyryl), $R^{12}$ is a hydrogen atom or a lower alkyl radical of 1-4 carbon atoms, and Y is selected from —OH, —$OR^{13}$ and —$NHR^4$ groups, wherein $R^4$ is defined as above and $R^{13}$ is an alkyl radical of 1-30 carbon atoms, at least one of the recurrent units (A), (B), (C), and/or (D) of said copolymer comprising at least 12 carbon atoms, preferably at least 16 carbon atoms, and at least 10% of the recurrent units of said copolymer being recurrent units (B) of imide type of the above-mentioned general formulas wherein X is the =N—$R^4$ group.

The copolymers of the present invention are random copolymers, i.e. copolymers wherein the distribution of monomer recurrent units along the chain is aleatory.

According to the present invention, the preferred copolymers are those formed of (A), (B), (C) and optionally (D) recurrent units, more precisely defined hereinafter.

(A) recurrent units deriving from alpha olefins present in the copolymer are usually those complying with the above formula wherein $R^1$ is a hydrogen atom or a methyl group and $R^2$ is a hydrogen atom or an alkyl group of 1-28 carbon atoms. Although certain branched alpha olefins can be used, substantially linear (i.e. with only a few branches) alpha olefins are preferred, particularly the linear alpha olefins of 2-30 carbon atoms or more, advantageously of 12-28 carbon atoms. In the above formula $R^1$ is a hydrogen atom and $R^2$ a hydrogen atom or a linear alkyl group of 1-28 carbon atoms, preferably a linear alkyl group of 10-26 carbon atoms.

Mixtures of linear alpha olefins having 14-21 carbon atoms, 18-24 carbon atoms or 22-30 carbon atoms are advantageously used.

Examples of specific compounds are: ethylene, propylene, butenes, 1-hexene, 1-heptene, 1-octene, diisobutylene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 1-heneicosene, 1-docosene, 1-tricosene, 1-tetracosene, 1-pentacosene, 1-hexacosene, 1-heptacosene, 1-octacosene, 1-nonacosene and 1-triacontene.

Recurrent units (B) deriving from unsaturated dicarboxylic compounds, in the form of diacids, lower alkyl diesters, imides or anhydrides, present in the copolymer, are usually those corresponding to the above formulas wherein $R^3$ is a hydrogen atom or a methyl group and $R^5$ and $R^6$ are each a hydrogen atom. Recurrent units (B) preferably derive from an anhydride or an imide, particularly from maleic anhydride, citraconic (methylmaleic) anhydride, itaconic (methylene maleic) anhydride, glutaconic anhydride and N-substituted imides corresponding to said anhydrides. Recurrent units (B) preferably derive from maleic anhydride and from N-substituted maleimides.

In the above formulas, when X is an $=N-R^4$ group, the compounds with primary amine group from which X derives may be selected from the following compounds.

1. Primary amines of formula $R-NH_2$ (corresponding to the above formula wherein Z is an $-NH-$ group and m is zero), wherein R is preferably a monovalent saturated aliphatic radical, advantageously linear, and contains 10-24 carbon atoms. $R-NH_2$ then represents a linear primary mono-alkylamine.

Specific examples of said amines are: methylene, ethylamine, propylamine, butylamine, pentylamine, hexylamine, nonylamine, decylamine, dodecylamine, tetradecylamine, hexadecylamine, octadecylamine, eicosylamine and docosylamine.

2. Polyamines of formula

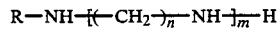

(corresponding to the above formula a wherein Z is an $-NH-$ group, m a number from 1 to 4 and n a number from 2 to 4, preferably 3), wherein R is preferably a saturated, advantageously linear radical containing 8-24 carbon atoms.

Specific compounds are N-alkyl, 1,3-diaminopropane wherein the linear alkyl group comprises 1-24 carbon atoms and preferably 7-24 carbon atoms, for example N-dodecyl 1,3-diaminopropane, N-tetradecyl 1,3-diaminopropane, N-hexadecyl 1,3-diaminopropane, N-octadecyl 1,3-diaminopropane, N-eicosyl 1,3-diaminopropane and N-docosyl 1,3-diaminopropane. Further examples are N-alkyldipropylenetriamines wherein the linear alkyl group comprises 1-24 carbon atoms and, for example, as compounds whose alkyl group comprises 12-24 carbon atoms: N-hexadecyldipropylene triamine, N-octadecyldipropylene triamine, N-eicosyldipropylene triamine and N-docosyldipropylene triamine.

3. Polyamines complying with the formula:

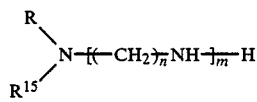

(corresponding to the above general formula where Z is $-NR^{15}-$, wherein R is an alkyl radical of 1-30 carbon atoms, preferably of 8-24 carbon atoms and $R^{15}$ is an alkyl radical of 1-30 carbon atoms, preferably of 1-24 carbon atoms, R and $R^{15}$ preferably containing together 9-32 carbon atoms, n is a number from 2 to 4 and m a number from 1 to 4, R and $R^{15}$ being preferably linear.

Specific compounds are N,N-diethyl 1,2-diaminoethane, N,N-diisopropyl 1,2-diaminoethane, N,N-dibutyl 1,2-diaminoethane, N,N-diethyl 1,4-diaminobutane, N,N-dimethyl 1,3-diaminopropane, N,N-diethyl 1,3-diaminopropane, N,N-dioctyl 1,3-diaminopropane, N,N-didecyl 1,3-diaminopropane, N,N-didodecyl 1,3-diaminopropane, N,N-ditetradecyl 1,3-diaminopropane, N,N-dihexadecyl 1,3-diaminopropane, N,N-dioctadecyl 1,3-diaminopropane, N,N-didodecyldipropylene triamine, N,N-ditetradecyldipropylene triamine, N,N-dihexadecyldipropylene triamine, N,N-dioctadecyldipropylene triamine, N-methyl, N-butyl 1,2-diaminoethane, N-methyl, N-octyl 1,2-diaminoethane, N-ethyl, N-octyl 1,2-diaminoethane, N-methyl, N-decyl 1,2-diaminoethane, N-methyl, N-dodecyl 1,3-diaminopropane, N-methyl, N-hexadecyl 1,3-diaminopropane and N-ethyl, N-octadecyl 1,3-diaminopropane.

4. Ether amines complying with the formula:

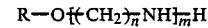

(corresponding to the above general formula wherein Z is an oxygen atom), R being preferably a monovalent saturated aliphatic linear radical of 1-30 carbon atoms, advantageously of 8-24 carbon atoms, n being an integer from 2 to 4, preferentially 2 or 3 and m an integer from 1 to 4, preferentially 1 or 2.

Examples of alkylether-amine specific compounds are: 2-methoxyethylamine, 3-methoxypropylamine, 4-methoxybutylamine, 3-ethoxypropylamine, 3-octyloxypropylamine, 3-decyloxypropylamine, 3-hexadecyloxypropylamine, 3-eicosyloxypropylamine, 3-docosyloxypropylamine, N-(3-octyloxypropyl) 1,3-diaminopropane, N-(3-decyloxypropyl)1,3-diaminopropane, (2,4,6-trimethyldecyl) 3-oxypropylamine and N-(2,4,6-trimethyldecyl) 3-oxypropyl 1,3-diaminopropane.

5. Amino-alcohols complying with the above general formula wherein $R^{14}$ is a divalent aliphatic, preferably saturated and linear, radical containing 2-30 carbon atoms, preferably 8-24 carbon atoms. Preferred amino-alcohols are those comprising a primary alcohol group, more particularly $\alpha,\omega$ amino-alcohols.

Specific examples are: monoethanolamine, 1-amino 3-propanol, 1-amino 4-butanol, 1-amino 5-pentanol, 1-amino 6-hexanol, 1-amino 7-heptanol, 1-amino 8-octanol, 1-amino 10-decanol, 1-amino 11-undecanol, 1-amino 13-tridecanol, 1-amino 14-tetradecanol, 1-amino 16-hexadecanol, 2-amino 2-methyl 1-propanol, 2-amino 1-butanol and 2-amino 1-pentanol.

It must be understood that recurrent units (B) wherein X is an $=N-R^4$ group may possibly derive from only one of the above-described compounds with primary amine group or from several of these compounds.

Specific examples of mixture of compounds with primary amine group are:

Primary fatty amine cuts whose alkyl chains comprise $C_8$, $C_{10}$, $C_{12}$, $C_{14}$, $C_{16}$, $C_{18}$, $C_{20}$ and $C_{22}$ chains in the approximate molar proportions indicated in the following table.

| cut | alkyl chains proportion (%) of | | | | | | | |
|---|---|---|---|---|---|---|---|---|
| | $C_8$ | $C_{10}$ | $C_{12}$ | $C_{14}$ | $C_{16}$ | $C_{18}$ | $C_{20}$ | $C_{22}$ |
| A | 0 | 0 | 0 | 1 | 28 | 71 | 0 | 0 |
| B | 0 | 0 | 0 | 1 | 5 | 42 | 12 | 40 |
| C | 3 | 6 | 56 | 18 | 10 | 7 | 0 | 0 |

Recurrent units (C) deriving from 1,2-diol unsaturated esters present in the copolymers are usually those corresponding to the above formula wherein $R^7$ is a hydrogen atom or a methyl group, $R^{10}$ is a hydrogen atom, $R^8$ is a saturated aliphatic divalent radical, preferably linear, having 1–30 carbon atoms, preferably 6–24 carbon atoms and advantageously 6–21 carbon atoms, q is zero or 1, $R^9$ is saturated monovalent aliphatic radical, preferably linear, having 2–30 carbon atoms, preferably 6–28 carbon atoms and advantageously 10–26 carbon atoms, $R^{11}$ is a hydrogen atom or a lower acyl radical derived from a saturated aliphatic monocarboxylic acid, preferably linear, of 1–4 carbon atoms, $R^{11}$ is preferably a hydrogen atom or an acetyl group, the preferred esters being those complying with at least one of the general formulas:

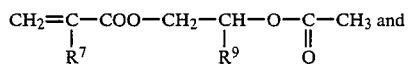

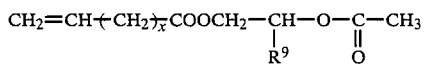

wherein $R^7$ and $R^9$ have the same meaning as above and x is an integer from 6 to 21.

Recurrent units (C) are preferably obtained from unsaturated monocarboxylic acids or derivatives thereof which are reacted with at least one ending group epoxide, the resultant product being then optionally involved in a reaction for completely or partly converting the hydroxy group to alkoxy or acyl group by methods well known in the art.

The unsaturated monocarboxylic acids comply with the general formula:

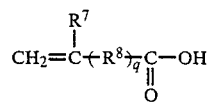

wherein $R^7$, $R^8$ and q are defined as above.

Specific compounds are: acrylic acid, methacrylic acid, 8-nonene 1-carboxylic (or caproleic) acid, 9-dec-ene 1-carboxylic acid, 4-pentene 1-carboxylic acid, 5-hexene 1-carboxylic acid, 3-butene 1-carboxylic acid, 7-octene 1-carboxylic acid, 10-undecene 1-carboxylic acid and 11-dodecene 1-carboxylic acid The ending group epoxides comply with the general formula:

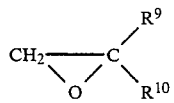

wherein $R^9$ and $R^{10}$ are defined as above.

Specific compounds are: 1,2-epoxybutane, 1,2-epoxypentane, 1,2-epoxyhexane, 1,2-epoxyheptane, 1,2-epoxyoctane, 1,2-epoxynonane, 1,2-epoxydecane, 1,2-epoxyundecane, 1,2-epoxydodecane, 1,2-epoxytetradecane, 1,2-epoxypentadecane, 1,2-epoxyhexadecane, 1,2-epoxyheptadecane, 1,2-epoxyoctadecane, 1,2-epoxynonadecane, 1,2-epoxyeicosane, 1,2-epoxydocosane, 1,2-epoxytetracosane, 1,2-epoxyhexacosane and epoxidated polybutenes of average molecular weight (Mn) ranging from about 350 to about 600.

Examples of compounds used to convert the secondary hydroxyl group formed during the reaction between the unsaturated monocarboxylic acid and the ending group epoxide are: dimethylsulfate, diethylsulfate, and anhydrides of lower monocarboxylic acids such for example as acetic anhydride and propionic anhydride.

Recurrent units (D) deriving from acrylic compounds present in the copolymer are usually those corresponding to the above formula wherein $R^{12}$ is a hydrogen atom or a methyl group and Y is an OH, —$NHR^4$ or preferably —$OR^{13}$ group, $R^{13}$ being an alkyl radical, preferably linear, of 1–30, preferably 4–24, advantageously 12–22 carbon atoms and $R^4$ an alkyl group, preferably linear, of 1–30, preferably 4–24 and advantageously 10–24 carbon atoms.

Specific compounds are for example: methyl, propyl, butyl, ethyl-heyxl, decyl, dodecyl, hexadecyl, octadecyl, eicosyl and docosyl acrylates and methacrylates and also acrylates and methacrylates of industrial alcohol cuts containing, as an average, 12 carbon atoms (lauryl acrylate and methacrylate) or 18 carbon artoms (stearyl acrylate and methacrylate), or of heavier alcohol cuts of high $C_{20}$–$C_{24}$ alcohol content.

Among the above-defined copolymers, those having an average molecular weight of about 1,000–15,000 are considered more particularly.

The respective proportions of recurrent units (A), (B), (C) and (D) forming the copolymer are preferably 15–55% by mole of units (A), 10–60% by mole of units (B), 15–50% by mole of units (C) and a proportion of units (D) at most equal to that of units (C).

Preferably at least 15% of the recurrent units of said copolymer are units (B) of above general formulas wherein X is an =N—$R^4$ group.

Preferably at least 80% of recurrent units (B) present in the copolymer comply with the above general formulas wherein X is an =N—$R^4$ group.

Two groups of copolymers are particularly preferred: those which contain exclusively (A), (B) and (C) recurrent units, without (D) units, and those comprising a non negligible proportion of (D) units, preferably a proportion substantially equal to that of recurrent units (C).

The preparation of the additives according to the present invention is generally conducted in several successive steps. The following embodiments of the preparation method are given as non limitative examples.

FIRST EMBODIMENT

The preparation comprises the following steps of:

(a) Reacting at least one unsaturated acid with at least one ending group monoepoxide to form an ester-alcohol of the unsaturated acid. This reaction is performed under conventional conditions, well known in the art, for example by heating the reactants, optionally in the presence for example of a hydrocarbon solvent such as cyclohexane, benzene, isooctane, dodecane, toluene, xylene or diisopropylbenzene or hydrocarbon cuts of relatively high boiling point, such as a kerosene or a gas-oil. The reaction temperature is usually from 60° to 200° C., for example about 160° C. A catalyst, for example a Lewis base is generally used. Examples of catalysts are: tertiary amines, particularly triethylamine, N,N dimethylbenzylamine, etc. . . . The reaction time varies according to the other operating conditions and the involved products. The reaction development may be followed by measuring the acid index. Usually a reaction time of about 3 hours is sufficient.

(b) Optionally converting at least partly the hydroxyl groups of the product obtained in step (a) to alkoxy or to acyl groups. The techniques used for this conversion are well known in the art. For example, the hydroxyl groups may be esterified by means of acid anhydrides, such as acetic anhydride. Generally the anhydride is used in excess with respect to the ester-alcohol amount to be converted: for example and anhydride/ester-alcohol molar ratio from 1.1:1 to 3:1, advantageously 2:1, may be used. The reaction temperature is usually about 60°–180° C., for example about 130° C. The reaction may be conducted in the absence or in the presence of a solvent such for example as one of the solvents used in the above step (a).

(c) Preparing the copolymer according to conventional copolymerization methods through a radical process, for example in the presence of an initiator of the azobisisobutyronitrile or peroxide type, in solution in a hydrocarbon solvent such for example as one of the solvents used in above-mentioned step (A) or an oxygenated solvent such for example as tetrahydrofuran or dioxane. The solvent amount will usually be such that the concentration by weight of dry matter be about from 25 to 70%, for example about 60%. The copolymerization in the presence of the radical initiator is performed at a temperature of about 70°–210° C., preferably 90°–170° C., for example about 140° C. The reaction time depends on the other operating conditions and may range for example from 2 to 18 hours. A solution of copolymers is obtained as a clear yellow viscous liquid. In this copolymerization at least three monomers are used: at least one alpha olefin, at least one unsaturated dicarboxylic compound and preferably at least one anhydride of dicarboxylic acid such as above defined by formulas of recurrent units (B) wherein X is an oxygen atom, at least one compound generating recurrent units (C) as above described and optionally at least one compound generating recurrent units (D) as above described.

(d) Condensing at least one compound having a primary amine group with the copolymer formed in step (c), in any usual manner, and generally adding to the copolymer solution obtained in step (c) the compound having a primary amine group such as above described, in a molar proportion substantially corresponding to the proportion of dicarboxylic compounds involved in the copolymer preparation. This proportion may be for example of about 0.9–1.1 mole of compound having a primary amine group per mole of dicarboxylic compound.

The reaction is performed by heating the mixture at a temperature of about 70°–200° C., preferably 90°–180° C., for example about 150° C. The reaction time is generally from 1 to 24 hours, 4 hours being generally sufficient.

The reaction of the compounds having a primary amine group with at least a part of recurrent units (B) (anhydride recurrent units) of the copolymer obtained in step (c) generates imide (succinimide) groups. This reaction being accompanied with the formation of water (or alcohols according to the nature of the dicarboxylic recurrent units (B)), optionally said water (or said alcohol) may be removed from the reaction mixture by stripping with an inert gas such for example as nitrogen, or by azeotropic distillation with the selected solvent.

SECOND EMBODIMENT

The preparation comprises the following steps of:

(a) reacting at least one dicarboxylic compound with at least one compound having a primary amine group, under conditions well known in the art, to form compounds of the N-substituted imide type;

(b) copolymerizing at least one alpha olefin, at least one unsaturated acid as above defined, at least one compound having a N-substituted imide group, as obtained in step (a), and optionally at least one compound generating recurrent units (D) as above described, by a radical process under conventional conditions;

(c) condensing the copolymer obtained in step (b) with at least one ending group monoepoxide, under conventional conditions for the formation of ester from epoxide and carboxylic acids, the molar amount of ending group epoxide being generally of about 1–3 moles, preferably 1.1–2 moles per mole of unsaturated acid involved in the copolymerization step (b);

(d) optionally reacting the resultant product of step (c), which comprises hydroxyl groups, with reactants adapted to convert at least partly said hydroxyl groups to alkoxy or acyl groups, in a conventional manner. For example the product of step (c) may be reacted with acetic anhydride so as to at least partly convert the hydroxyl groups to acetyl groups.

THIRD EMBODIMENT

The preparation comprises the following steps of:

(a) reacting at least one dicarboxylic compound with at least one compound having a primary amine group, under conditions well known in the art, so as to form compounds of the N-substituted imide type;

(b) reacting at least one unsaturated acid with at least one ending group epoxide so as to form, as in step (a) of the first embodiment, an ester-alcohol of the unsaturated acid;

(c) optionally reacting the product of step (b) with a reactant adapted to convert hydroxyl groups at least partly to alkoxy or acyl groups, for example as described in step (b) of the first embodiment;

(d) copolymerizing at least one alpha olefin, at least one N-substituted imide obtained in step (a), at least one compound generating recurrent units (C), obtained in step (b) or in step (c), and optionally at least one compound generating recurrent units (D), said copolymerization being performed conventionally by a radical process.

FOURTH EMBODIMENT

This embodiment essentially concerns the preparation of copolymers comprising recurrent units (C) deriving from acrylic acid esters of 1,2-diols.

This preparation comprises the following steps of:

(a) copolymerizing under conventional conditions, by a radical process, at least one alpha olefin, at least one unsaturated dicarbocylic compound (preferably at least one anhydride of dicarboxylic acid as above defined by formulas of recurrent units (B) wherein X is an oxygen atom), acrylic acid and optionally at least one compound generating recurrent units (D) as above described, (b) reacting the copolymer obtained in step (a) with at least one compound having a primary amine group so as to convert at least partly the anhydride recurrent units (B) to recurrent units (B) of N-substituted imide type, (c) reacting the product obtained in step (b) with at least one monoepoxide so as to convert at least a major part, preferably the totality, of the recurrent units originating from acrylic acid to recurrent units (C) of ester-alcohol structure, as above defined, and (d) optionally reacting in a conventional manner the resultant product from step (c), which comprises free hydroxyl groups, with reactants adapted to at least partly convert said hydroxyl groups to alkoxy or acyl groups.

The additives are obtained as a solution in the selected solvent and may be incorporated directly in this form with oil middle distillates (particularly gas-oils) the pour point of which has to be improved.

The pour point of the middle distillates is clearly improved by incorporating therewith a proportion by weight of said additives ranging from 0.001 to 2%, preferably from 0.01 to 1% and advantageously from 0.02 to 0.3%. It is particularly advantageous to use copolymers according to the invention wherein at least two types of recurrent units from (A), (B), (C) and (D) recurrent units comprise at least 12 carbon atoms, preferably at least 16 carbon atoms and more advantageously those wherein (A), (B) and (C), and optionally (D) recurrent units comprise at least 12 carbon atoms and preferably at least 16 carbon atoms. Thus, preferred recurrent units (A) are those complying with the formula:

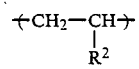

wherein $R^2$ is a linear alkyl group of 10–26 carbon atoms. The preferred recurrent units (B) are those deriving from maleic anhydride and N-substituted maleimides of formulas:

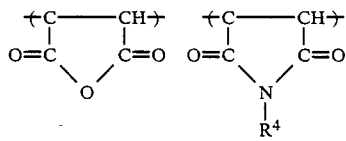

wherein $R^4$ is a monovalent organic radical deriving from a primary amine having 8–24 carbon atoms, preferably a linear radical originating from an amine of formula $R-NH_2$ wherein R is a linear alkyl radical of 10–24 carbon atoms, or from a diamine of formula $R-NH-(CH_2)_n-NH_2$ wherein n is an integer from 2 to 4, preferably 3, and R is a linear alkyl radical of 10–24 carbon atoms. Preferred recurrent units (C) are those corresponding to one of the formulas:

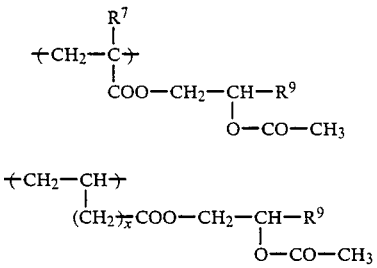

wherein $R^7$ is hydrogen or a methyl group, x is an integer from 6 to 21 and $R^9$ is a linear alkyl radical of 10–26 carbon atoms. Preferred recurrent units (D), when present in the copolymer, originate from alkyl acrylate and/or methacrylate whose alkyl group is linear and contains 12–22 carbon atoms.

Middle distillate (particularly gas-oil) compositions according to the invention comprise a major proportion of oil middle distillate as above defined, and a minor proportion of at least one copolymer as above defined, sufficient to lower the pour point.

The so-defined middle distillate compositions may also comprise other additives such as antioxidants, dispersing, antistatic agents etc . . . These compositions generally comprise at least 95%, preferably at least 98% by weight of middle distillate.

The lowering of the pour point may reach for example 15° C. or more. Simultaneously a lowering of the cloud point, which may reach for example 2° C. or more, may be observed.

EXAMPLES

The following examples are given to illustrate the invention but must not be considered as limiting the scope thereof.

EXAMPLE 1

(a) 27.6 g (0.15 mole) of undecylenic acid and 41.4 g (0.15 mole equivalent) of epoxyoctadecane containing 5.8% of oxygen are introduced into a reactor equipped with a stirring system and a temperature regulation system. The epoxyalkane is dissolved at 40° C. under stirring. Then 0.36 g ($2.7 \cdot 10^{-3}$ mole) of N,N-dimethylbenzylamine is added into 4.5 g of xylene. The reaction mass is brought to 160° C. for 3 hours. The opening of the epoxide ring and the fixation of the acid are followed by meauring the acid index. After 3 hours of reaction, the acid index decreased from 103 to 7.3 mg of potassium hydroxide per gram. The esteralcohol is obtained with a yield of 93% and is separated as a yellow solid product.

(b) 36 g of the ester-alcohol obtained in step (a), i.e 0.079 mole, and 15 g of acetic acid, i.e 0.147 mole, are introduced into the same reactor. The whole mixture is brought to 130° C. for 3 hours. The infra-red spectrum shows that the characteristic band of secondary alcohols, at about 3,350 $cm^{-1}$ disappears during the reaction. The reaction mass is diluted with 50 ml of xylene, neutralized with a sodium bicarbonate aqueous solution, washed with water and dried over sodium sulfate. After xylene evaporation, the unsaturated diester is obtained as a liquid product.

(c) 7.4 g (0.076 mole) of maleic anhydride, 11 g (0.038 mole) of an alpha olefin cut containing by weight about 1% of $C_{18}$ olefins, 49% of $C_{20}$ olefins, 42% of $C_{22}$ olefins and 8% of $C_{24}$ olefins, 37.5 g (0.076 mole) of the unsaturated diester obtained in step (b), and 85 g of xylene are introduced into a double-jacket reactor equipped with stirring means and a temperature regulation system and an inert gas supply. Then 0.58 g of tert-butyl peroxybenzoate, diluted with a small xylene amount, is introduced in continuously 6 hours by means of a syringe pump.

The temperature is brought to 140° C. for 7 hours under stirring, and a copolymer solution is obtained as a clear yellow viscous liquid containing about 37% by mole of recurrent units deriving from the unsaturated diester, 18% by mole of recurrent units deriving from alpha olefins and 45% by mole of recurrent units deriving from maleic anhydride. Its number molecular weight is 5,300.

(d) 21.3 g (0.076 mole equivalent) of a primary fatty amine cut whose alkyl chains contains, as an average by mole, 1% of $C_{14}$, 28% of $C_{16}$ and 71% of $C_{18}$, are introduced into the same double-jacket reactor equipped with a Dean and Stark apparatus. After 4 hours of heating at 150° C. and recovery of 1.2 ml of water, a clear yellow viscous solution is obtained which forms the "mother solution" of additive I, containing 52% by weight of dry matter.

The infra-red analysis of said solution shows the disappearance of the absorption band corresponding to C=O bonds of anhdride type, initially at about 1,775 cm$^{-1}$. Simultaneously a band appears at about 1,705–1,695 cm$^{-1}$, attributable to C=O bonds of imide type.

The number molecular weight of additive I is 5,800.

EXAMPLES 2 and 3

A copolymer is prepared in the same manner and from the same compounds as in example 1 and, on various parts of this polymer, compounds having primary amine groups are condensed according to the operating mode described in step (d) of example 1 and with the same molar proportions as in example 1.

EXAMPLE 2

The primary fatty amine cut has alkyl chains comprising, as an average by mole, about 3% of $C_8$, 6% of $C_{10}$, 56% of $C_{12}$, 18% of $C_{14}$, 10% of $C_{16}$ and 7% of $C_{18}$. A solution additive II is thus obtained.

EXAMPLE 3

The amine cut is a N-alkyl 1,3-diaminopropane cut formed of amines whose alkyl chains comprise, as an average by mole, about 1% of $C_{14}$, 5% of $C_{16}$, 42% of $C_{18}$, 12% of $C_{20}$ and 40% of $C_{22}$. A solution of additive III is thus obtained.

EXAMPLES 4, 5 and 6

An unsaturated diester is prepared according to the experimental conditions of steps (a) and (b) of example 1. Three parts of said unsaturated diester are subjected to polymerization as described in step (c) of example 1, with the use of different alpha olefins. On these three new copolymers, the same fatty amine cut as used in step (d) of example 1 is condensed according to the operating mode described in step (d) of example 1.

EXAMPLE 4

The alpha olefin cut used to prepare the copolymer contains by weight, as an average, 1% of $C_{14}$ olefins, 17% of $C_{15}$ olefins, 18% of $C_{16}$ olefins, 17% of $C_{17}$ olefins, 17% of $C_{18}$ olefins, 15% of $C_{19}$ olefins, 12% of $C_{20}$ olefins and 3% of $C_{21}$ olefins. After condensation of the amine cut described in step (d) of example 1, additive IV is obtained.

EXAMPLE 5

The alpha olefin cut used to prepare the copolymer contains by weight, as an average, about 1% of $C_{22}$ olefins, 30% of $C_{24}$ olefins, 39% of $C_{26}$ olefins, 20% of $C_{28}$ olefins and 10% of $C_{30}$ olefins. The condensation, on the obtained copolymer, of the amine cut described in step (d) of example 1 gives additive V.

EXAMPLE 6

The alpha olefin used to prepare the copolymer is diisobutylene. After condensation of the amine cut described in step (d) of example 1, additive VI is obtained.

EXAMPLES 7 AND 8

Under the experimental conditions described in step (a) of example 1, two ester-alcohols are prepared which differ from that prepared in step (a) of example 1 by the nature of the epoxyalkane. These two ester-alcohols are esterified by acetic anhydride according to the operating mode described in step (b) of example 1. The polymerization is performed with the same monomers and under the same conditions as in step (c) of example 1, and the same fatty amine cut as used in step (d) of example 1 is condensed with these two resultant new copolymers according to the same operating mode.

EXAMPLE 7

The epoxyalkane has been obtained by oxidation of an alpha olefin cut containing by weight, as an average, about 1% of $C_{18}$ olefins, 49% of $C_{20}$ olefins, 42% of $C_{22}$ olefins and 8% of $C_{24}$ olefins. Steps (a), (b), (c) and (d) are conducted as in example 1, under the same conditions. Additive VII is thus obtained.

EXAMPLE 8

The epoxyalkane is epoxyhexadecane of 62% oxygen content. After the operations described in steps (a), (b), (c) and (d) of example 1, additive VIII is obtained.

EXAMPLE 9

(a) 58 g (0.2 mole) of an alpha olefin cut containing by weight about 1% of $C_{18}$ olefins, 49% of $C_{20}$ olefins, 42% of $C_{22}$ olefins and 8% of $C_{24}$ olefins, and 39.2 g (0.4 mole) of maleic anhydride in 189 g of xylene are introduced into a double-jacket reactor equipped with a stirring system, a cooler and an inert gas supply. The reaction mass is brought to 140° C. By means of a syringe pump, 28.8 g (0.4 mole) of acrylic acid and 3.05 g of tert-butyl peroxybenzoate diluted in a small xylene amount, are then introduced continuously in 7 hours. The temperature in the reactor is maintained for one additional hour at 140° C. and a copolymer is obtained in solution as a clear-yellow viscous liquid containing 42% by mole of recurrent units deriving from acrylic acid, 42% by mole of recurrent units deriving from maleic anhydride and 16% by mole of recurrent units deriving from alpha olefins. It has a number molecular weight of 4,500.

(b) 159 g of the copolymer solution obtained in step (a) an 56 g (0.2 mole equivalent) of a primary fatty amine cut whose alkyl chains comprises, as an average by mole, 1% of $C_{14}$, 28% of $C_{16}$ and 71% of $C_{18}$, are introduced into a double-jacket reactor equipped with a Dean and Stark apparatus. After heating for 3 hours at 150° C., 3.5 ml of water and a clear-yellow viscous solution in xylene containing 54% by weight of dry matter, are recovered. The infra-red analysis shows the presence of bands attributable to C=O bonds of imide type.

(c) 105 g of the solution obtained in step (b) (i.e 0.1 mole equivalent) and 27.6 g (i.e 0.1 mole equivalent) of epoxyoctadecane containing 5.8% of oxygen, are introduced into a reactor equipped with a stirring system and a cooler. Then 0.65 g of N,N-dimethylbenzylamine are added and the mixture is heated for 4 hours at 160° C. The obtained solution is diluted by adding xylene so as to reduce the dry matter concentration to 50% by weight. The obtained diluted solution forms the "mother solution" of additive IX. The number molecular weight of additive IX is 5,200.

EXAMPLE 10

Under the experimental conditions described in step (a) of example 1, an ester-alcohol is prepared which differs from that prepared in step (a) of example 1 by the nature of the unsaturated acid which consists of a cut of unsaturated acids comprising 20% by mole of $C_{11}$ acid, 64% by mole of $C_{13}$ acid, 2.8% by mole of $C_{16}$ acid and 6.4% by mole of acids lighter than $C_{11}$ or heavier than $C_{16}$.

0.05 mole of said ester-alcohol (i.e 24.4 g) is polymerized with 0.05 mole of 2-ethylhexyl acrylate (i.e 9.2 g), 0.05 mole of the $C_{18}$–$C_{24}$ olefin cut described in step (c) of example 1 (i.e 14.5 g) and 0.1 mole of maleic anhydride (i.e 9.8 g) under the same conditions as in step (c) of example 1. Then the same fatty amine cut as used in step (d) of example 1 is condensed with said copolymer according to the same operating mode. Additive X is thus obtained.

EXAMPLE 11 (COMPARATIVE)

Stearyl undecylenate is prepared from 10-undecenoic acid and octadecanol in usual esterification conditions, and under in the same conditions as in step (c) of example 1: 0.1 mole of the $C_{18}$–$C_{24}$ olefin cut defined in step (c) of example 1 (i.e 29 g), 0.2 mole of maleic anhydride (i.e 19.6 g) and 0.2 mole of stearyl undecylenate (i.e 87.3 g), are copolymerized in the presence of 204 g of xylene.

A copolymer solution is obtained as a clear-yellow viscous liquid containing about 38% by weight of dry matter.

Then the same fatty amine cut as used in step (d) of example 1 is condensed with said copolymer according to the same operating mode. Additive XI is thus obtained.

EXAMPLE 12 (COMPARATIVE)

A terpolymer is prepared under the same conditions as in step (c) of example 1 by reacting 70 g of a mixture of alkyl acrylates (containing about 5% of stearyl acrylate, 30% of eicosyl acrylate and 25% of behenyl acrylate) with 15 g of maleic anhydride and 15 g of diisobutylene. 43 g of the fatty amine cut used in step (d) of example 1 are added to the obtained solution. The reaction is performed according to the operating mode described in step (d) of example 1. Additive XII is thus obtained.

The above-described additives are obtained as solution in xylene. Their concentration is generally adjusted to 50% of dry matter. The obtained solutions form the "mother solutions" of said additives, the activity of which is tested by incorporating them with two gas-oil cuts of ARAMCO origin, hereinafter referred to as $G_1$ and $G_2$, in a proportion of 0.1% by weight of additive. The characteristics of these cuts are reported in table I below.

TABLE I

| Gas-oils | ASTM distillation D 86 - 67 Ip°C. | Fp°C. | % distilled at 350° C. | Density at 15° C. in kg/l |
|---|---|---|---|---|
| $G_1$ | 181 | 382 | 89 | 0.846 |
| $G_2$ | 189 | 373 | 93 | 0.844 |

Each of the formed compositions has been subjected to two determinations:

Cloud point according to Standard ASTM D 2 500-66;

Pour point according to Standard ASTM D 97-60.

The results of these determinations are reported in table II hereinafter:

TABLE II

| Additives | Cloud point (°C.) $G_1$ | $G_2$ | Pour point (°C.) $G_1$ | $G_2$ |
|---|---|---|---|---|
| none | +2 | −1 | −6 | −9 |
| 0.1% I | −1 | −4 | −21 | −21 |
| 0.1% II | 0 | −3 | −18 | −18 |
| 0.1% III | −1 | −3 | −15 | −18 |
| 0.1% IV | 0 | −3 | −18 | −24 |
| 0.1% V | 0 | −2 | −21 | −21 |
| 0.1% VI | 0 | −3 | −15 | −18 |
| 0.1% VII | −1 | −4 | −12 | −15 |
| 0.1% VIII | 0 | −2 | −24 | −27 |
| 0.1% IX | −2 | −5 | −12 | −12 |
| 0.1% X | 0 | −2 | −18 | −15 |
| 0.1% XI | −1 | −4 | −6 | −9 |
| 0.1% XII | −1 | −4 | −9 | −9 |

The above results show the good efficiency of additives I to X, particularly for lowering the pour point, whereas additives XI and XII, which do not correspond to the invention but are indicated by way of comparison, are only efficient for lowering the cloud point.

What is claimed as the invention is:

1. A copolymer of average number molecular weight of about 400 to 50,000 comprising:
   (a) 5–60% by mole of recurrent units (A) deriving from alpha olefins of 2–36 carbon atoms complying with the general formula:

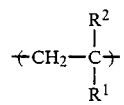

wherein $R^1$ is a hydrogen atom or a lower alkyl group of 1–4 carbon atoms and $R^2$ is a hydrogen atom or an alkyl group of 1–30 carbon atoms,
   (b) 10–70% by mole of recurrent units (B) deriving from unsaturated dicarboxylic compounds complying with one of the general formulas:

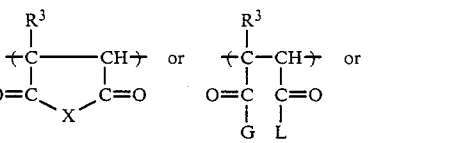

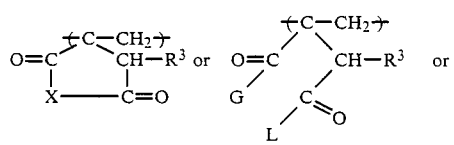

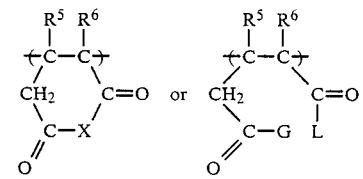

wherein $R^3$ is a hydrogen atom or a lower alkyl group of 1–4 carbon atoms, X is an oxygen atom or an =N—R⁴ group in which R⁴ is a monovalent organic radical deriving from a compound containing a primary amine group complying with one of the general formulas:

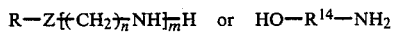

wherein R is a monovalent aliphatic radical of 1-30 carbon atoms, Z is selected from the oxygen atom —O— and —NR¹⁵— groups wherein R¹⁵ is a hydrogen atom or a monovalent aliphatic radical of 1-30 carbon atoms, n is an integer from 2 to 4, m is an integer from 1 to 4 or may be zero when Z is —NH—, R¹⁴ is a divalent aliphatic radical of 2-30 carbon atoms, each of G and L, identical or different, is an —OH, —OR¹ or —NHR⁴ group, in which R¹ and R⁴ are defined as precedingly, and each of R⁵ and R⁶, identical or different, is a hydrogen atom or a lower alkyl group of 1-4 carbon atoms, at least one of them being a hydrogen atom, (c) 10-70% by mole of recurrent units (C) deriving from unsaturated esters of 1,2-diols, complying with the general formula:

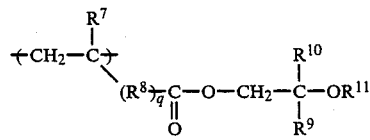

wherein each of R⁷ and R¹⁰, identical or different, is hydrogen atom or a lower alkyl group of 1-4 carbon atoms, R⁸ is a divalent aliphatic radical of 1-30 carbon atoms, q is zero or 1, R⁹ is a monovalent aliphatic radical of 2-30 carbon atoms, and R¹¹ is a hydrogen atom, a lower alkyl group of 1-4 carbon atoms or a lower acyl radical of 1-4 carbon atoms, and (d) 0-60% by mole of recurrent units (D) deriving from acrylic compounds complying with the general formula:

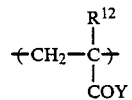

wherein R¹² is a hydrogen atom or a lower alkyl radical of 1-4 carbon atoms, Y is a —OH, —NHR⁴ or —OR¹³ wherein R⁴ is defined as above and R¹³ is an alkyl radical of 1-30 carbon atoms, at least one of the recurrent units (A), (B), (C) and/or (D) of said copolymer containing at least 12 carbon atoms, and at least 10% of the recurrent units of said copolymer being recurrent units (B) of imide type, conforming with the above general formulas wherein X is an =N—R⁴ group.

2. A copolymer according to claim 1, characterized in that recurrent units (A) derive from a linear alpha olefin of 2-30 carbon atoms, recurrent units (B) derive from unsaturated dicarboxylic compounds selected from the group formed of anhydrides and N—substituted imides derived from maleic acid, methylmaleic acid, itaconic acid and glutaconic acid, recurrent units (C) derive from unsaturated esters of 1,2-diols and comply with at least one of the general formulas:

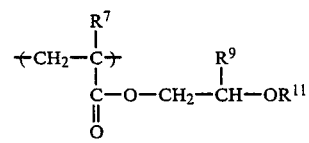

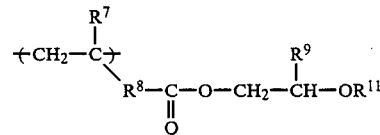

wherein R⁷ is a hydrogen atom or a methyl group, R⁸ is a saturated divalent aliphatic radical of 6-24 carbon atoms, R⁹ is a monovalent saturated aliphatic hydrocarbon of 6-28 carbon atoms, and R¹¹ is a hydrogen atom or an acetyl group, and recurrent units (D) derive from acrylic compounds and conform with the formula:

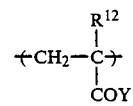

wherein Y is an —OH, —NHR⁴ or —OR¹³, R¹³ being an alkyl group of 4-24 carbon atoms, R⁴ an alkyl group of 4-24 carbon atoms, and R¹² a hydrogen atom or a methyl group.

3. A copolymer according to claim 1, characterized in that recurrent units (A) derive from a linear alpha olefin of 12-28 carbon atoms, recurrent units (B) derive from maleic anhydride and N—substituted maleimides, recurrent units (C) derive from unsaturated esters of 1,2-diols and comply with at least one of the formulas:

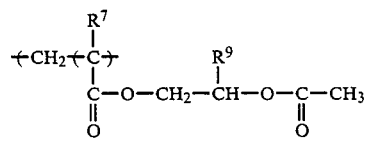

and

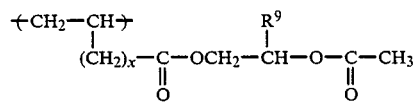

wherein R⁷ is a hydrogen atom or a methyl group, R⁹ is a monovalent linear saturated aliphatic radical of 10-26 carbon atoms and x is an integer from 6 to 21, and recurrent units (D) derive from acrylic compounds and comply with the formula:

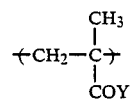

wherein Y is an —OH, —NHR⁴ or —OR¹³ group, in which R¹³ is an alkyl group of 12-22 carbon atoms and R⁴ an alkyl group of 10-24 carbon atoms.

4. A copolymer according to claim 1, characterized in that recurrent units (B) derive from maleic anhydride or from N—substituted maleimides whose substituent originates from a compound with primary amine group complying with one of the general formulas:

R—NH$_2$ wherein R is a linear alkyl radical of 10–24 carbon atoms,

wherein R is a linear alkyl radical of 8–24 carbon atoms, R$^{15}$ is a hydrogen atom or a linear alkyl radical of 1–24 carbon atoms, R and R$^{15}$ having together 9–32 carbon atoms, n is an integer from 2 to 4 and m an integer from 1 to 4,

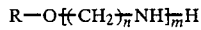

wherein R is a linear alkyl radical of 8≧24 carbon atoms, n is an integer from 2 to 4 and m an integer from 1 to 4, HO—R$^{14}$—NH$_2$ wherein R$^{14}$ is a linear or branched alkylene radical of 8–24 carbon atoms.

5. A copolymer according to claim 1, characterized by a proportion by mole of 15–55% of recurrent units (A), 10–60% of recurrent units (B), 10–50% of recurrent units (C) and a proportion of recurrent units (D) at most equal to that of recurrent units (C), the sum of percentages by mole of recurrent units (A), (B), (C) and (D) contained therein being equal to 100%.

6. A copolymer according to claim 1, characterized in that it does not contain recurrent units (D), the sum of the percentages by mole of recurrent units (A), (B) and (C) being equal to 100%.

7. A middle distillate composition characterized in that it comprises a major proportion of middle distillate having a distillation range from 150° to 450° C. and a minor proportion, sufficient to lower the pour point, of at least one copolymer according to claim 1.

8. A middle distillate composition according to claim 7, characterized in that said middle distillate consists of a gas-oil cut having distillation range from an initial temperature of 160°–190° C. to a final temperature of 360°–430° C.

9. A middle distillate composition according to claim 8, characterized by a proportion of said copolymer from 0.001 to 2% by weight.

10. A middle distillate composition according to claim 9, characterized by a proportion of said copolymer from 0.01 to 1% by weight.

11. A middle distillate composition according to claim 7, characterized by a proportion of said copolymer from 0.001 to 2% by weight.

12. A copolymer according to claim 1, wherein
(a) the alpha-olefin is based on recurrent units of the formula

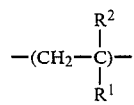

in which R$^1$ is H, R$^2$ is an alkyl group of 10 carbon atoms;
(b) recurrent units (B) derive from unsaturated dicarboxylic compound of the formula:

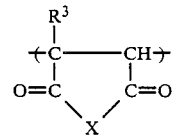

wherein R$^3$ is hydrogen, X is =NR$^4$,
R$^4$ is R—Z[—(CH$_2$)$_n$—NH]$_m$—H, Z is NH, m is zero and
R is alkyl having 18 carbon atoms; and
(c) recurrent units (C) derive from unsaturated esters of 1,2-diols of the formula

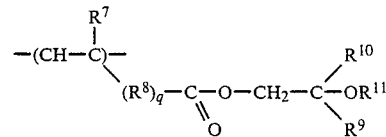

wherein R$^7$ is hydrogen, R$^{10}$ is hydrogen, R$^9$ is alkyl having 10 carbon atoms, R$^{11}$ is acetyl, and q is zero.

13. A copolymer according to claim 12, wherein the copolymer contains 0–60% of recurrent units (D) wherein R$^{12}$ is hydrogen, Y is OR$^{13}$ and R$^{13}$ is alkyl having 12 carbon atoms.

14. A middle distillate composition characterized in that it comprises a major proportion of middle distillate having a distillation range from 150° to 450° C. and a minor proportion, sufficient to lower the pour point, of at least one copolymer according to claim 12.

15. A middle distillate composition according to claim 14, characterized in that said middle distillate consists of a gas-oil cut having a distillation range from an initial temperature of 160°–190° to a final temperature of 360°–430° C.

16. A middle distillate composition according to claim 14, characterized by a proportion of said copolymer from 0.001 to 2% by weight.

17. A middle distillate composition characterized in that it comprises a major proportion of middle distillate having a distillation range from 150° to 450° C. and a minor proportion, sufficient to lower the pour point, of at least one copolymer according to claim 14.

* * * * *

UNITED STATES PATENT AND TRADEMARK OFFICE
CERTIFICATE OF CORRECTION

PATENT NO. : 4,900,332

DATED : February 13, 1990

INVENTOR(S) : JACQUES DENIS ET AL

It is certified that error appears in the above-identified patent and that said Letters Patent is hereby corrected as shown below:

Column 19, claim 4, line 19:

reads "wherein R is a linear alkyl radical of $8 \geqq 24$ carbon"

should read -- wherein R is a linear alkyl radical of 8-24 carbon --

Signed and Sealed this

Eighteenth Day of December, 1990

Attest:

HARRY F. MANBECK, JR.

*Attesting Officer*     *Commissioner of Patents and Trademarks*